(12) United States Patent
Cabodi et al.

(10) Patent No.: US 8,273,673 B2
(45) Date of Patent: *Sep. 25, 2012

(54) DOPED REFRACTORY WITH A HIGH ZIRCONIA CONTENT

(75) Inventors: Isabelle Cabodi, Cavaillon (FR); Michel Gaubil, Les Angles (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 166 days.

This patent is subject to a terminal disclaimer.

(21) Appl. No.: 12/672,795

(22) PCT Filed: Aug. 21, 2008

(86) PCT No.: PCT/FR2008/051515
§ 371 (c)(1),
(2), (4) Date: Mar. 26, 2010

(87) PCT Pub. No.: WO2009/027610
PCT Pub. Date: Mar. 5, 2009

(65) Prior Publication Data
US 2011/0212826 A1 Sep. 1, 2011

(30) Foreign Application Priority Data
Aug. 24, 2007 (FR) .................................. 07 57178

(51) Int. Cl.
*C04B 35/484* (2006.01)
(52) U.S. Cl. ........................ 501/105; 501/107
(58) Field of Classification Search ................. 501/105, 501/107
See application file for complete search history.

(56) References Cited

U.S. PATENT DOCUMENTS

| | | | |
|---|---|---|---|
| 3,343,593 A | 9/1967 | Goton et al. | |
| 4,461,843 A | 7/1984 | McGarry et al. | |
| 4,507,394 A | 3/1985 | Mase et al. | |
| 5,023,218 A | 6/1991 | Zanoli et al. | |
| 5,028,572 A | 7/1991 | Kim et al. | |
| 5,086,020 A | 2/1992 | Ishino et al. | |
| 5,344,801 A | 9/1994 | Kida et al. | |
| 5,466,643 A | 11/1995 | Ishino et al. | |
| 5,679,612 A | 10/1997 | Endo et al. | |
| 7,129,192 B2 * | 10/2006 | Boussant-Roux et al. | 501/105 |
| 7,598,195 B2 | 10/2009 | Gupta et al. | |
| 7,655,587 B2 * | 2/2010 | Boussant-Roux et al. | 501/105 |
| 7,687,422 B2 * | 3/2010 | Boussant-Roux et al. | 501/105 |
| 7,842,633 B2 | 11/2010 | Tomura et al. | |
| 2005/0159294 A1 * | 7/2005 | Boussant-Roux et al. | 501/104 |
| 2008/0076659 A1 | 3/2008 | Boussant-Roux et al. | |
| 2009/0038936 A1 | 2/2009 | Boussant-Roux et al. | |
| 2009/0176642 A1 | 7/2009 | Tomura et al. | |
| 2010/0068492 A1 * | 3/2010 | Boussant-Roux et al. | 428/220 |
| 2010/0089098 A1 * | 4/2010 | Citti et al. | 65/374.13 |
| 2010/0257901 A1 * | 10/2010 | Cabodi et al. | 65/374.13 |

FOREIGN PATENT DOCUMENTS

| | | |
|---|---|---|
| EP | 0 403 387 A1 | 12/1990 |
| FR | 1 208 577 | 2/1960 |
| FR | 75 893 | 7/1961 |
| FR | 82 310 | 12/1963 |
| FR | 1 430 962 | 1/1966 |
| FR | 2 701 022 A1 | 8/1994 |
| FR | 2 897 861 A1 | 8/2007 |
| FR | 2 897 862 A1 | 8/2007 |
| GB | 930605 | 7/1963 |
| GB | 1 036 893 | 7/1966 |
| JP | A-2000-302560 | 10/2000 |
| JP | A-2003-292382 | 10/2003 |
| JP | A-2004-099441 | 4/2004 |
| WO | WO 03/074445 A1 | 9/2003 |
| WO | WO 2005/068393 A1 | 7/2005 |

OTHER PUBLICATIONS

Written Opinion of the International Searching Authority mailed on Mar. 10, 2009 in corresponding International Application No. PCT/FR2008/051515 (with translation).
Mar. 10, 2009 International Search Report issued in International Application No. PCT/FR2008/051515 (with translation).
International Search Report issued in International Patent Application No. PCT/FR2008/051516 on Mar. 11, 2009.
Written Opinion of the International Search Authority issued in Intenational Application No. PCT/FR2008/051516 on Mar. 11, 2009.
Aug. 18, 2011 Office Action issued in U.S. Appl. No. 12/526,675.
Apr. 13, 2011 Office Action issued in U.S. Appl. No. 12/526,675.
Oct. 28, 2011 Notice of Allowance issued in U.S. Appl. No. 12/526,675.
Nov. 4, 2011 Office Action issued in U.S. Appl. No. 12/673,138.
U.S. Appl. No. 12/526,675 in the name of Boussant-Roux et al., filed Oct. 30, 2009.
U.S. Appl. No. 12/673,138 in the name of Cabodi et al., filed May 28, 2010.
Mar. 7, 2012 Final Rejection issued in U.S. Appl. No. 12/673,138.

* cited by examiner

*Primary Examiner* — Karl Group
(74) *Attorney, Agent, or Firm* — Oliff & Berridge, PLC

(57) ABSTRACT

The invention provides a fused cast refractory product with a high zirconia content comprising, as. a percentage by weight based on the oxides:
  $ZrO_2+Hf_2O$: >85%;
  $SiO_2$: 6% to 12%;
  $Al_2O_3$: 0.4% to 1%;
  $Y_2O_3$: 0.2%;
  a dopant selected from the group formed by $Nb_2O_5$, $Ta_2O_5$, and mixtures thereof, in a quantity such that the molar ratio $ZrO_2/(Nb_2O_5+Ta_2O_3)$ is in the range 200 to 350.

26 Claims, No Drawings

DOPED REFRACTORY WITH A HIGH ZIRCONIA CONTENT

This application is a National Phase application of international application PCT/FR2008/051515, filed on Aug. 21, 2008, which claims priority to FR 07 57178, filed on Aug. 24, 2007.

The invention relates to a novel fused cast refractory product with a high zirconia content.

BACKGROUND

Refractory products include fused cast products, which are well known in the construction of glass-melting furnaces, and sintered products.

In contrast to sintered products such as those described, for example, in U.S. Pat. No. 4,507,394, fused cast products usually include an intergranular vitreous phase connecting together the crystalline grains. The problems posed by sintered products and by fused cast products, and the technical solutions adopted to overcome them thus generally differ. A composition that has been developed for the production of a sintered product is thus not, a priori, of use per se in producing a fused cast product, and vice versa.

Fused cast products, often termed electrofused products, are obtained by melting a mixture of appropriate starting materials in an electric arc furnace or by using any other technique that is suitable for such products. The molten liquid is then cast into a mold and the product obtained undergoes a controlled cooling cycle to bring it to ambient temperature without fracturing. This operation is termed "annealing" in the art.

Fused cast products include electrofused products with a high zirconia content, i.e. comprising more than 85% by weight of zirconia $ZrO_2$); (they are well known for their very good resistance to corrosion without coloring the glass produced and without generating defects.

Conventionally, fused cast products with a high zirconia content also include sodium oxide ($Na_2O$) to prevent the formation of zircon from the zirconia and silica present in the product. Zircon formation is in fact deleterious, since it is accompanied by a reduction in volume of the order of 20%, thus creating mechanical stresses that are the source of cracks.

The product ER-1195, produced and marketed by the Société Européenne des Produits Réfractaires and protected by European patent EP-B-0 403 387, is currently widely used in glass-melting furnaces. Its chemical composition comprises approximately 94% of zirconia, 4% to 5% of silica, approximately 1% of alumina, 0.3% of sodium oxide and less than 0.05% by weight of $P_2O_5$. It is typical of products with a high zirconia content that are used for glass furnaces.

French patent FR-A-2 701 022 describes fused cast products with a high zirconia content that contain 0.05% to 1.0% by weight of $P_2O_5$ and 0.05% to 1.0% by weight of boron oxide, $B_2O_3$. Said products have a high electrical resistivity. This can advantageously stabilize the consumption of electricity during electric melting of the glass and above all, this can overcome any problems with short circuiting in refractories, causing their rapid degradation. During electric melting of glass, some of the electric current passes through the refractory products. Thus, increasing the resistivity of said refractory products can reduce the quantity of electric current that passes through them.

International patent document WO-A-2005/068393 describes fused cast products with a high zirconia content having a high electrical resistivity while minimizing the quantities of BaO, SrO, MgO, CaO, $P_2O_5$, $Na_2O$, and $K_2O$. Said products contain 0.1% to 1.2% by weight of $B_2O_3$.

Japanese patent document JP 2000 302 560 describes fused cast products that do not contain $Nb_2O_5$ or $Ta_2O_5$.

The current trend for very high quality glass, in particular glass for LCD type flat screens, is increasing the demand for refractory products from glass-melting furnaces. In particular, there is a need for refractory products with further improved electrical resistivity while retaining good feasibility and good service characteristics.

SUMMARY

The aim of the present invention is to satisfy this need.

More particularly, in a first aspect, the invention provides a fused cast refractory product with a high zirconia content comprising, as a percentage by weight based on the oxides;
$ZrO_2+Hf_2O$: >85%;
$SiO_2$: 6% to 12%;
$Al_2O_3$: 0.4% to 1%;
$Y_2O_3$: ≦0.2%; and
a dopant selected from the group formed by $Nb_2O_5$, $Ta_2O_5$ and mixtures thereof.

DETAILED DESCRIPTION

As can be seen below, surprisingly, the inventors have discovered that this composition enables a refractory product in accordance with the invention to have remarkable electrical resistivity while retaining good feasibility and good service characteristics.

The refractory product of the invention may also have one or more of the following optional characteristics:
- the $ZrO_2/(Nb_2O_5+Ta_2O_5)$ molar ratio is more than 200 and/or leas than 350;
- the total quantity of dopant is 0.2% or more, preferably 0.25% or more and/or 5% or less, 3% or less, 1% or less, 0.8% or less, 0.5% or less, preferably 0.4% or less, as a molar percentage based on the oxides;
- the quantity by weight of dopant $Ta_2O_5$ is 0.1% or more, preferably 0.2% or more, and/or 2.5% or less, preferably 1.5% or less;
- the quantity by weight of dopant $Nb_2O_5$ is 0.1% or more, preferably 0.2% or more, and/or 1.5% or less, preferably 1.0% or less;
- at least 80%, preferably at least 90%, or even at least 99% or substantially 100% of the zirconia is unstabilized monoclinic, the percentages being by weight;
- the quantity by weight of silica, $SiO_2$, is 6.5% or more, preferably 7% or more. It may be 10% or less, or even 9% or less. In a variation, it may also be more than 8.5%, or even 9%, or even 10%, or even more than 10.1%, or even more than 10.5%;
- the quantity by weight of boron oxide, $B_2O_3$, is 0.2% or more, preferably 0.3% or more and/or 1.0% or less, preferably 0.8% or less;
- the quantity by weight of sodium oxide, $Na_2O$, is 0.1% or less, preferably 0.05% or less, more preferably 0.03% or less;
- the quantity by weight of alumina, $Al_2O_3$, is preferably 0.5% or more and/or preferably 0.8% or less;
- the species other than $ZrO_2+HfO_2$, $SiO_2$, $B_2O_3$, $Al_2O_3$, $Y_2O_3$, BaO, $Ta_2O_5$, and $Nb_2O_5$ represent, by weight, less than 1.5%, preferably less than 1%, more preferably less than 0.5%;

the species other than $ZrO_2+HfO_2$, $SiO_2$, $B_2O_3$, $Al_2O_3$, $Y_2O_3$, $Ta_2O_5$, and $Nb_2O_5$ represent, by weight, less than 1.5%, preferably less than 1%, more preferably less than 0.5%;

the quantity by weight of barium oxide, BaO, is 0.6% or less, preferably less than 0.5%;

the complement by weight to 100% is constituted by impurities, the total impurities content preferably being less than 0.5%; and the refractory product has the following composition by weight, with $ZrO_2+HfO_2$ and the impurities as the complement to 100%:
  $SiO_2$: 7% to 9%;
  $B_2O_3$: 0.3% to 0.8%;
  $Al_2O_3$: 0.4% to 0.8%;
  $Y_2O_3$: $\leq 0.2\%$; and
  in the range 0.2% to 1.5% of $Ta_2O_5$ and/or in the range 0.2% to 1.0% of $Nb_2O_5$.

Advantageously, these characteristics can further improve the electrical resistivity and the corrosion resistance of the product of the invention.

The refractory product of the invention has an electrical resistivity of 500 Ω·cm [ohm·centimeter] or more, preferably 600 Ω·cm or more, at 1500° C. at a frequency of 100 Hz [hertz].

In accordance with a further aspect, the invention provides a fused cast refractory product with a high zirconia content comprising, as a percentage by weight based on the oxides:
  $ZrO_2+Hf_2O$: >85%;
  $SiO_2$: 6% to 12%;
  $Y_2O_3$: $\leq 0.2\%$; and
  a dopant selected from $Ta_2O_5$ and $Nb_2O_5$, and preferably from mixtures of $Nb_2O_5$ and $Ta_2O_5$, in which $Nb_2O_5$>0.1% and, with mixtures of $Nb_2O_5$ and $Ta_2O_5$, $Ta_2O_5$>0.1%, as a percentage by weight based on the oxides and when $Ta_2O_5$ is the only dopant, $Ta_2O_5 \leq 1.5\%$.

The refractory product of the invention may also have one more of the following optional characteristics:
  the $ZrO_2/(Nb_2O_5+Ta_2O_5)$ molar ratio is in the range 200 to 350;
  the total quantity of dopant is 0.2% or more, preferably 0.25% or more and/or 5% or less, 3% or less, 1% or less, 0.8% or less, 0.5% or less, preferably 0.4% or less, as a molar percentage based on the oxides;
  the quantity by weight of dopant $Ta_2O_5$ is 0.2% or more and/or 2.5% or less, preferably 1.5% or less;
  the quantity by weight of dopant $Nb_2O_5$ is 0.2% or more and/or 1.5% or less, preferably 1.0% or less;
  at least 80%, preferably at least 90%, or even at least 99% or substantially 100% of the zirconia is monoclinic, the percentages being by weight;
  the quantity by weight of silica, $SiO_2$, is 6.5% or more, preferably 7% or more. It may be 10% or less, or even 9% or less. In a variation, it may also be more than 8.5%, or even 9%, or even 10%, or even more than 10.1%, or even more than 10.5%;
  the quantity by weight of boron oxide, $B_2O_3$, is 0.2% or more, preferably 0.3% or more and/or 1.0% or less, preferably 0.8% or less;
  the quantity by weight of sodium oxide, $Na_2O$, is 0.1% or less, preferably 0.05% or less, more preferably 0.03% or less;
  the quantity by weight of alumina, $Al_2O_3$, is preferably 0.4% or more, preferably 0.5% and/or preferably 1% or less, preferably 0.8%;
  the quantity by weight of barium oxide, BaO, is 0.6% or less, preferably less than 0.5%;
  the species other than $ZrO_2+HfO_2$, $SiO_2$, $B_2O_3$, $Al_2O_3$, $Y_2O_3$, BaO, $Ta_2O_5$, and $Nb_2O_5$ represent, by weight, less than 1.5%, preferably less than 1%, more preferably less than 0.5%; and
  the species other than $ZrO_2+HfO_2$, $SiO_2$, $B_2O_3$, $Al_2O_3$, $Y_2O_3$, $Ta_2O_5$, and $Nb_2O_5$ represent, by weight, less than 1.5%, preferably less than 1%, more preferably less than 0.5%;
  the complement to 100% by weight is constituted by impurities, the total impurities content preferably being less than 0.5%.

In accordance with a further aspect, the invention Provides a fused cast refractory product with a high zirconia content comprising:
  $ZrO_2+Hf_2O$: >85%;
  $SiO_2$: 6% to 12%;
  $Y_2O_3$: $\leq 0.2\%$;
  a dopant selected from mixtures of $Nb_2O_5$ and $Ta_2O_5$, in which $Ta_2O_5$<1%, as a percentage by weight based on the oxides.

Preferably, the $ZrO_2/(Nb_2O_5+Ta_2O_5)$ molar ratio is more than 200 and less than 350.

The refractory product of the invention may also have one more of the following optional characteristics:
  the total quantity of dopant is 0.2% or more, preferably 0.25% or more and/or 5% or less, 3% or less, 1% or less, 0.8% or less, 0.5% or less, preferably 0.4% or less, as a molar percentage based on the oxides;
  the quantity by weight of dopant $Nb_2O_5$ is 0.1% or more, preferably 0.2% or more and/or 1.5% or less, preferably 1.0% or less;
  at least 80%, preferably at least 90%, or even at least 99% or substantially 100% of the zirconia is unstabilized monoclinic, the percentages being by weight;
  the quantity by weight of silica, $SiO_2$, is 6.5% or more, preferably 7% or more. It may be 10% or less, or even 9% or less. In a variation, it may also be more than 8.5%, or even 9%, or even 10%, or even more than 10.1%, or even more than 10.5%;
  the quantity by weight of boron oxide, $B_2O_3$, is 0.2% or more, preferably 0.3% or more and/or 1.0% or less, preferably 0.8% or less;
  the quantity by weight of sodium oxide, $Na_2O$, is 0.1% or less, preferably 0.05% or less, more preferably 0.03% or less;
  the quantity by weight of alumina, $Al_2O_3$, is preferably 0.4% or more, preferably 0.5% and/or preferably 1% or less, preferably 0.8%;
  the quantity by weight of barium oxide, BaO, is 0.6% or less, preferably less than 0.5%;
  the species other than $ZrO_2+HfO_2$, $SiO_2$, $B_2O_3$, $Al_2O_3$, $Y_2O_3$, BaO, $Ta_2O_5$ and $Nb_2O_5$ represent, by weight, less than 1.5%, preferably less than 1%, more preferably less than 0.5%;
  the species other than $ZrO_2+HfO_2$, $SiO_2$, $B_2O_3$, $Al_2O_3$, $Y_2O_3$, $Ta_2O_5$ and $Nb_2O_5$ represent, by weight, less than 1.5%, preferably less than 1%, more preferably less than 0.5%; and
  the complement to 100% by weight is constituted by impurities, the total impurities content preferably being less than 0.5%.

The invention also provides a glass-melting furnace including a refractory product in accordance with the invention, in particular in regions intended to come into contact with molten glass.

Finally, the invention provides a method of producing a refractory product in accordance with the invention, comprising the following steps in succession:

a) mixing starting materials, with the introduction of a dopant, to form a starting charge;

b) melting said starting charge until a molten liquid is obtained;

c) casting and solidifying said molten liquid by controlled cooling to obtain a refractory product;

said method being remarkable in that said starting materials are selected such that said refractory product is in accordance with the invention.

Unless otherwise mentioned, all of the percentages in the present description are percentages by weight based on the oxides.

In the fused cast products of the invention, the high zirconia content, i.e. $ZrO_2 > 85\%$, means that it can satisfy the demands for high corrosion resistance without coloring the glass produced and without generating defects that are deleterious to the quality of said glass.

Hafnium oxide, $HfO_2$, present in the product of the invention is the hafnium oxide naturally present in sources of zirconia. Its quantity by weight in the product of the invention is thus 5% or less, generally 2% or less.

The presence of silica is necessary for the formation of an intergranular vitreous phase that can effectively accommodate variations in the volume of the zirconia during its reversible allotropic transformation, i.e. during passage from the monoclinic phase to the tetragonal phase.

The inventors have discovered that a quantity by weight of silica of more than 6% can produce higher electrical resistivities.

In contrast, the added silica must not exceed 12% by weight since, by reducing the zirconia content, it would cause the corrosion resistance would be too greatly reduced. Further, too high a quantity of silica could generate defects in the glass by releasing stones (Pieces of refractory product resulting from a loss of cohesion of the product), which is considered to be a poor service characteristic.

The presence of alumina is favourable for the formation of a stable vitreous phase and for good castability of the products into the mold. An excessive amount causes instability of the vitreous phase (crystal formation), which has a negative impact on feasibility. Preferably, the content by weight of alumina must thus remain below 1.0%.

Preferably, the product of the invention comprises a quantity by weight of $B_2O_3$ of more than 0.3%, preferably more than 0.4%. The feasibility is improved thereby. The $B_2O_3$ content must preferably remain 1.0% or less. Advantageously, the formation of zircon in the product is limited.

Yttrium oxide, $Y_2O_3$, has an unfavorable effect on electrical resistivity. Its quantity by weight must thus be less than 0.2%.

The presence of dopant in the products of the invention is necessary in order to improve the electrical resistivity. However, the total content of said dopant oxides must not be too high so that the percentage of zirconia is kept at a sufficiently high level to ensure good resistance to corrosion by the molten glass and to retain good stability in the vitreous phase.

The inventors have established that the dopants $Nb_2O_5$ and $Ta_2O_5$ have a substantially identical effect at identical molar quantities. Without wishing to be bound by any particular theory, the inventors explain this effect by the role played by the dopants as regards oxygen voids in the zirconia. The dopants would in fact each compensate for one oxygen void.

Thus, 1.66 g [gram] of $Ta_2O_5$ has an equivalent effect to 1 g of $Nb_2O_5$.

The inventors have established that the electrical resistivity is particularly enhanced when the ratio between the molar percentage of zirconia and the molar percentage of dopant is in the range 200 to 350. This range corresponds to an optimum doping of zirconia grains. It indicates the quantity of dopant necessary and sufficient to fill the oxygen voids.

The complement by weight to 100% in the composition of the product of the invention is constituted by other species. Preferably, the "other species" are merely impurities.

The term "impurities" means inevitable constituents necessarily introduced with the starting materials or resulting from reactions with these constituents. Hafnium oxide present in the zirconia source is not considered to be an impurity. Impurities are constituents that are not necessary but that are merely accepted.

Examples that may be mentioned are alkaline oxides, in particular sodium oxide, $Na_2O$, and potassium oxide, $K_2O$, which can be accepted but preferably must not exceed 0.2% by weight, more preferably 0.1%, and more preferably be present in trace amounts only. Otherwise, the electrical resistivity would be degraded because of the increased conductivity of the vitreous phase. Oxides of iron, titanium, and phosphorus are known to be harmful, and their contents must be limited to the traces introduced with the starting materials as impurities. Preferably, the quantity by weight of $Fe_2O_3+TiO_2$ is less than 0.55% and that of $P_2O_5$ is less than 0.05%.

The product of the invention is constituted by grains of unstabilized monoclinic zirconia surrounded by a vitreous phase principally constituted by silica. Without wishing to be bound by one theory, the inventors consider that the composition of the product of the invention can maximize the electrical resistivity both of the grains of zirconia and the vitreous phase by obtaining a synergistic effect with all of the constituents.

A product of the invention may be produced by following steps a) to c) described below:

a) mixing starting materials, with the introduction of a dopant, to form a starting charge;

b) melting said starting charge until a molten liquid is obtained;

c) solidifying said molten liquid by controlled cooling to obtain a refractory product in accordance with the invention.

In step a), the dopant is added in a manner that guarantees the quantity of dopant in the finished product of the invention.

In step b), melting is preferably carried out by the combined action of a fairly long electric arc that does not cause reduction and stirring, favoring re-oxidation of the products. Melting is carried out at a temperature of more than 2300° C., preferably in the range 2400° C. to 2500° C.

To minimize the formation of nodules with a metallic appearance and to prevent the formation of apertures or crazing in the finished product, it is preferable to carry out melting under oxidizing conditions.

Preferably, a long arc fusion method is used, as described in French patent FR-A-1 208 577 and its patents of addition, numbers 75893 and 82310.

That method consists in using an electric arc furnace the arc of which arcs between the charge and at least one electrode that is separated from said charge, and adjusting the length of the arc so that its reducing action is reduced to a minimum, while maintaining an oxidizing atmosphere above the melt and stirring said melt either by the action of the arc itself or by bubbling an oxidizing gas (air or oxygen, for example) into the melt, or by adding to the melt substances which release oxygen, such as peroxides.

In step c), cooling is preferably carried out at a rate of approximately 10° C. per hour.

Any conventional method of producing fused products based on zirconia intended for applications in glass-melting furnaces may be employed, provided that the composition of the starting charge allows products to be produced with a composition that is in accordance with that of the product of the invention.

The following non-limiting examples are given with the aim of illustrating the invention.

EXAMPLES

In these examples, the following starting materials were used:
- zirconia principally containing, as a mean percentage by weight, 98.5% of $ZrO_2+HfO_2$, 0.2% of $SiO_2$ and 0.02% of $Na_2O$;
- zircon sand containing 33% silica;
- type AC44 alumina sold by Pechiney and containing a mean of 99.4% of alumina $Al_2O_3$;
- oxides of barium, boron, yttrium, tantalum, $Ta_2O_5$, and niobium, $Nb_2O_5$, with a purity of more than 99%.

The examples were prepared using the conventional arc furnace melting method then cast to obtain blocks with a 220×450×150 mm [millimeter] format.

The chemical analysis of the products obtained is given in Table 1; it is a mean chemical analysis given as a percentage by weight with the exception of the column indicating the molar percentage of the sum of the oxides $Ta_2O_5$ and $Nb_2O_5$.

In this table, a blank entry corresponds to a quantity of 0.05% by weight or less.

Thus, the $Na_2O$ content is not indicated, since it was always less than 0.05% by weight.

The ratio Z/D corresponds to the ratio of the molar percentage of zirconia over the molar percentage of the sum of the oxides $Ta_2O_5$ and $Nb_2O_5$.

Cylindrical bars of product 30 mm in diameter and 30 mm in height were removed from the various samples of the blocks produced. These bars were subjected to a potential difference of 1 volt at a frequency of 100 Hz at 1500° C. to carry out the measurements of electrical resistivity R.

to corrosion by glass, are not degraded by the presence of a dopant in accordance with the invention.

Clearly, the present invention is not limited to the implementations described and shown that are provided by way of illustrative, non-limiting example.

The invention claimed is:

1. A fused cast refractory product with a high zirconia content comprising, as a percentage by weight based on the oxides:
   $ZrO_2 +Hf_2O$: >85%;
   $SiO_2$: 6% to 12%;
   $Al_2O_3$: 0.4% to 1%;
   $Y_2O_3$: ≦0.2%; and
   a dopant selected from the group consisting of $Nb_2O_5$, $Ta_2O_5$, and mixtures thereof.

2. A refractory product according to claim 1, in which a molar ratio of $ZrO_2/(Nb_2O_5 +Ta_2O_5)$ is in a range of 200 to 350.

3. A refractory product according to claim 1, in which a quantity by weight of sodium oxide, $Na_2O$, is 0.1% or less.

4. A refractory product according to claim 1, in which a quantity by weight of barium oxide, BaO, is 0.6% or less.

5. A refractory product according to claim 1, in which a quantity by weight of dopant $Ta_2O_5$ is 0.1% or more and/or a quantity by weight of dopant $Nb_2O_5$ is 0.1% or more.

6. A refractory product according to claim 1, in which a quantity by weight of dopant $Ta_2O_5$ is 0.2% or more and/or a quantity by weight of dopant $Nb_2O_5$ is 0.2% or more.

7. A refractory product according to claim 1, in which a quantity by weight of dopant $Ta_2O_5$ is 2.5% or less and/or a quantity by weight of dopant $Nb_2O_5$ is 1.5% or less.

8. A refractory product according to claim 1, in which a quantity by weight of dopant $Ta_2O_5$ is 1.5% or less and/or a quantity by weight of dopant $Nb_2O_5$ is 1.0% or less.

9. A refractory product according to claim 1, in which species other than $ZrO_2 +HfO_2$, $SiO_2$, $B_2O_3$, $Al_2O_3$, $Y_2O_3$, BaO, $Ta_2O_5$, and $Nb_2O_5$ represent less than 1.5% by weight.

10. A refractory product according to claim 1, in which a complement by weight to 100% is constituted by impurities.

TABLE 1

| | $ZrO_2$ | $SiO_2$ | $B_2O_3$ | $Al_2O_3$ | $Nb_2O_5$ | $Ta_2O_5$ | $Y_2O_3$ | BaO | $Ta_2O_5 + Nb_2O_5$ (mol %) | Z/D | R (Ω·cm) |
|---|---|---|---|---|---|---|---|---|---|---|---|
| 1 | 91.3 | 6.1 | 0.65 | 0.93 | 0.38 | 0.48 | 0.20 | | 0.29 | 294 | 675 |
| 2 | 91.3 | 6.1 | 0.60 | 0.95 | 0.40 | 0.49 | 0.19 | | 0.30 | 283 | 620 |
| 3 | 91.4 | 6.1 | 0.65 | 0.90 | 0.37 | 0.30 | 0.20 | | 0.24 | 358 | 347 |
| 4 | 91.3 | 6.7 | 0.60 | 0.50 | 0.51 | | 0.20 | 0.24 | 0.22 | 386 | 434 |
| 5 | 91.3 | 7.0 | 0.60 | 1.10 | | | | | | | 95 |
| 6 | 90.3 | 7.1 | 0.60 | 0.79 | 0.33 | 0.76 | 0.20 | | 0.34 | 247 | 507 |
| 7 | 91.1 | 7.5 | 0.60 | 0.44 | | | 0.17 | 0.13 | | | 253 |
| 8 | 90.0 | 8.1 | 0.41 | 0.54 | 0.74 | | 0.20 | | 0.32 | 262 | 780 |
| 9 | 89.8 | 8.3 | 0.60 | 1.20 | | | 0.10 | | | | 165 |
| 10 | 89.2 | 8.3 | 0.49 | 0.80 | 0.31 | 0.70 | 0.20 | | 0.31 | 263 | 918 |
| 11 | 89.8 | 8.4 | 0.48 | 0.44 | 0.66 | | 0.20 | | 0.28 | 294 | 746 |
| 12 | 89.3 | 8.9 | 0.49 | 0.47 | 0.71 | | 0.20 | | 0.30 | 271 | 857 |
| 13 | 87.6 | 9.0 | 0.65 | 0.60 | 0.37 | 0.61 | 0.19 | 1.10 | 0.31 | 256 | 861 |
| 14 | 88.6 | 9.3 | 0.54 | 0.50 | 0.76 | | 0.20 | 0.13 | 0.32 | 252 | 899 |

These examples show that satisfying the criterion 200≦Z/D≦350 can produce electrical resistivities R of more than 500 Ω·cm, in particular for silica contents of less than 7.0%. For silica contents of more than 7.0%, such resistivities are advantageously possible even without satisfying said criterion.

Further, other trials have verified that the other recognized properties for high zirconia materials, in particular resistance 11. A refractory product according to claim 10, in which a weight content of the impurities is less than 0.5%.

12. A refractory product according to claim 1, having the following composition by weight, with $ZrO_2 +HfO_2$ and impurities as a complement to 100%:
   $SiO_2$: 7% to 9%;
   $B_2O_3$: 0.4% to 0.8%;
   $Al_2O_3$: 0.5% to 0.8%;

Y$_2$O$_3$: ≦0.2%; and

Ta$_2$O$_5$ in a range of 0.2% to 1.5% and/or Nb$_2$O$_5$ in a range of 0.2% to 1.0%.

13. A refractory product according to claim 1, in which a total quantity of dopant is 0.5% or less, as a molar percentage based on the oxides.

14. A refractory product according to claim 1, in which a total quantity of dopant is 0.4% or less, as a molar percentage based on the oxides.

15. A refractory product according to claim 1, in which a total quantity of dopant is 0.2% or more, as a molar percentage based on the oxides.

16. A glass-melting furnace, comprising a refractory product in accordance with claim 1.

17. A refractory product according to claim 1, in which a quantity by weight of silica, SiO$_2$, is 6.5% or more.

18. A refractory product according to claim 1, in which a quantity by weight of silica, SiO$_2$, is 10% or less.

19. A refractory product according to claim 1, in which a quantity by weight of silica, SiO$_2$, is 7.0% or more.

20. A refractory product according to claim 1, in which a quantity by weight of silica, SiO$_2$, is 9% or less.

21. A refractory product according to claim 1, in which a quantity by weight of alumina, Al$_2$O$_3$, is 0.5% or more.

22. A refractory product according to claim 1, in which a quantity by weight of alumina, Al$_2$O$_3$, is 0.8% or less.

23. A refractory product according to claim 1, further comprising B$_2$O$_3$, a quantity of B$_2$O$_3$ being 0.2% or more.

24. A refractory product according to claim 23, in which a quantity by weight of B$_2$O$_3$ is 0.3% or more.

25. A refractory product according to claim 1, further comprising B$_2$O$_3$, a quantity of B$_2$O$_3$ being 1.0% or less.

26. A refractory product according to claim 25, in which a quantity by weight of B$_2$O$_3$ is 0.8% or less.

* * * * *